United States Patent [19]

Tarbet et al.

[11] Patent Number: 5,656,702
[45] Date of Patent: Aug. 12, 1997

[54] PROCESSES FOR SEPARATING CESIUM FROM INDUSTRIAL STREAMS CONTAINING OTHER ALKALI METALS USING POLY(HYDROXYARYLENE) POLYMERIC RESINS

[75] Inventors: Bryon J. Tarbet, Highland; Garren Maas; Krzysztof E. Krakowiak, both of Provo; Ronald L. Bruening, Springville, all of Utah

[73] Assignee: IBC Advanced Technologies, Inc., Provo, Utah

[21] Appl. No.: 334,789

[22] Filed: Nov. 4, 1994

[51] Int. Cl.$^6$ .............. C08F 283/00; C08G 8/00; C08L 61/06

[52] U.S. Cl. .............. 525/480; 528/129; 528/148; 528/212; 528/217; 521/39; 549/354; 210/660

[58] Field of Search .............. 528/129, 148, 528/212, 217; 525/73, 480; 549/354; 210/660; 521/39

[56] References Cited

U.S. PATENT DOCUMENTS 5,143,784  9/1992  Mita .............. 428/336

OTHER PUBLICATIONS

Schneider, Ulrich; Schneider, Hans–Joerg (Fr Organischeschemie Universitset dés Saarlardes, Saarbruecken, D–66041, Germany) Chem. Ber, 127 (12), 2455–G9 (Crevan) 1994.

Synthesis of amino methylated cedix (4) resorcinrenes Matsuchite et al.

Preparation of calixarene derivatives as extracting agents for rare earth metals Makashio et al.

Cyclic phenol–formaldehyde oztamers Lase et al.

*Primary Examiner*—James J. Seidleck
*Assistant Examiner*—Duc Truong
*Attorney, Agent, or Firm*—Thorpe, North & Western, L.L.P.

[57] ABSTRACT

A method for the removal separation, and concentration of cesium cations from a source solution which may contain larger concentrations of other alkali metal ions comprises bringing the source solution into contact with a polymeric resin containing poly(hydroxyarylene) ligands. The poly (hydroxyarylene) ligand portion(s) of the polymeric resins has affinity for cesium, thereby removing cesium from the source solution. The source solutions from which the cesium has been removed may then be treated or disposed of as desired and the cesium cations are then removed from the polymeric resin through contact with a much smaller volume of a receiving solution in which these cesium cations are soluble and has greater affinity for such cations than does the poly(hydroxyarylene) ligand or protonates the ligand, thereby quantitatively stripping the complexed cesium cations from the ligand and recovering them in concentrated form in said receiving solution. The concentrated cesium cations thus removed may be further separated and recovered by known methods. The process is useful in the removal of cesium cations from a variety of source solutions such as from semiconductor, nuclear waste cleanup, metals refining, electric power, and other industrial enterprises. The invention is also drawn to the poly(hydroxyarylene)-ligand-containing polymeric resins.

7 Claims, No Drawings

PROCESSES FOR SEPARATING CESIUM FROM INDUSTRIAL STREAMS CONTAINING OTHER ALKALI METALS USING POLY(HYDROXYARYLENE) POLYMERIC RESINS

FIELD OF THE INVENTION

This invention relates to a process for separating cesium from industrial streams wherein the cesium ion is present in admixture with other alkali metal cations and other chemicals that may be present in much higher concentrations by the use of poly(hydroxyarylene)-ligand-containing polymeric resins. More particularly, this invention relates to a process for removing cesium ions from an admixture with other alkali metal cations in solution by forming a complex of the Cs cation with compounds composed of poly (hydroxyarylene)-ligand-containing polymeric resins by flowing such solutions through a column, or similar means, packed with such poly(hydroxyarylene)-ligand-containing polymeric resins and then selectively breaking the complex of the Cs from the ligand portion of the polymeric resins to which the Cs ions have become attached. The receiving solution is used in smaller volume to remove and concentrate the separated cesium cations than the original volume of solution passed through the column. The Cs cations thus removed may then be recovered by known methods. Also, the source solution from which the cesium has been removed may be additionally treated, utilized or disposed of.

BACKGROUND OF THE INVENTION

The separation of trace quantities of Cs cations from industrial waste solutions containing other alkali metal cations and/or other chemicals is a difficult, but commercially important separation. Industries where such separations would be advantageous include the semiconductor, nuclear waste cleanup, metals refining, electric power, and other industrial enterprises. The separations are difficult because the Cs to be removed is often present only in concentrations ranging from parts-per-trillion (ppt) to low parts-per-million (ppm) levels and must be separated from other alkali metals that may be present in concentrations up to several molar. Hence, a kinetically rapid, highly selective, and strong thermodynamically interactive material is required for the separations.

Cs and Sr are two of the most important radioactive contaminants in nuclear waste. This is because $^{137}$Cs and $^{90}$Sr contribute about 98% of the thermal energy and 97% of the penetrating radiation during the first thirty years after nuclear waste is formed. It is highly desirable to selectively remove these elements to greatly enhance the safety of and reduce the volume of nuclear waste going to a long term geologic disposal repository for nuclear waste. Furthermore, in dilute radioactive contamination, such as in ground water, Cs and Sr are virtually the only radioactive waste problems requiring treatment. The need for both types of Cs and Sr treatment is found in many sites in the U.S.A. as well as in other countries throughout the world.

In the past, methods for the removal of cesium from nuclear waste streams have been inefficient. A few organic and inorganic ion exchange polymers have been prepared by a variety of methods for Cs separation. One such class of materials is a phenol-formaldehyde type polymer wherein a hydroxybenzene, such as phenol (i.e. CS-100, formerly made and sold by Rohm & Haas) or resorcinol, is reacted with formaldehyde, via hydroxymethylation, and further condensed to form a methylene linkage between benzene rings in the presence of a base or acid to produce a solid, glassy polymer having ion-exchange properties. See, e.g. U.S. Pat. No. 4,423,159. These materials, while functioning somewhat in the complexing of cesium ions, are of limited selectivity. This is particularly true when large concentrations of potassium and sodium are present. The inorganic ion exchange materials, such as crystalline silicotitanates (Sandia National Laboratory) and the ferricyanide-based materials, either lack the selectivity needed, are not elutable, or are not present in a sufficiently stable or practically useful format for effective use.

Calixarenes and related polyhydroxyaromatic molecules are known to have extremely high selectivity with respect to the cesium ion, R. M. Izatt et al., 105 J. Am. Chem. Soc. 1782 (1983); *Calixarenes, A Versatile Class of Macrocyclic Compounds* (J. Vicens & V. Bohmer eds., 1991); C. D. Gutsche, *Calixarenes* (1989). To use these molecules to perform separations, however, the molecules must be incorporated into systems where the Cs is selectively involved in a phase change. Previous attempts to involve the polyhydroxyaromatic molecules in Cs separation systems have involved solvent extraction and liquid membrane systems, R. M. Izatt et al., 105 J. Am. Chem. Soc. 1782 (1983); *Calixarenes, A Versatile Class of Macrocyclic Compounds* (J. Vicens & V. Bohmer eds., 1991); C. D. Gutsche, *Calixarenes* (1989). These systems have the disadvantages of the use of an organic solvent in the system, relatively slow kinetics, loss of efficiency as the Cs feed concentration decreases, loss of the costly molecule to the aqueous phases, formation of emulsions during the separation, and other difficulties. Moreover, these materials are quite hydrophobic and do not always retain the necessary properties for use in separating cesium from an aqueous system.

It would be desirable to formulate hydroxyaromatic ligands into a stable hydrophilic polymeric solid resin wherein the selective properties of the hydroxyaromatic ligands for cesium cations are maintained in an actual separation system and wherein the ligands can be reused efficiently with rapid kinetics hundreds or thousands of times to make separations. The reuse of such ligands makes their use economical and of significant industrial worth. These objectives are accomplished by means of the condensation of formaldehyde with a poly(hydroxyarylene) ligand and, optionally, other alkoxy- or hydroxy-aromatic compounds or methylated hydroxyaromatic compounds to form a polymeric resin and the use of such poly(hydroxyarylene) -containing polymeric resins in actual separation processes.

SUMMARY OF THE INVENTION

The present invention is drawn to the selective removal of cesium from industrial streams, and nuclear waste streams in particular, containing these cesium ions along with other alkali metal ions that may be present in greater concentrations but which are not targeted for removal by means of such poly(hydroxyarylene)-containing polymeric resins. The Cs ions separated from such streams are then removed from the ligand by elution using a receiving liquid. By other alkali metals is meant those metals of Periodic Table Classification IA selected from the group consisting of lithium, sodium, potassium, and rubidium. Other metal cations, i.e. alkaline earth and transition metal cations, may also be present in such industrial streams.

The poly(hydroxyarylene) ligands are those selected from the group consisting of calix[6]arene, calix[8]arene, alkyl-octols, and phloroglucide. These ligands are represented by Formulas I through IV as follows:

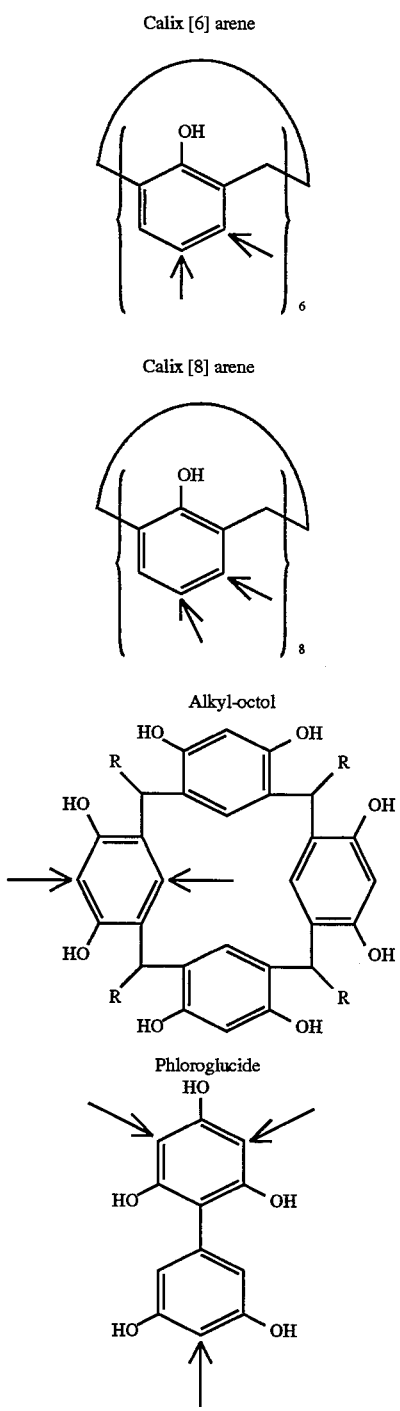

FORMULA I

Calix [6] arene

FORMULA II

Calix [8] arene

FORMULA III

Alkyl-octol

FORMULA IV

Phloroglucide wherein, in Formula III, R is lower alkyl and is preferably propyl. The arrows indicate reactive sites on the various poly(hydroxyarylene) ligands. All equivalent sites are equally reactive to hydroxymethylation reactions. The polymeric resins are prepared by reacting the poly(hydroxyarylene) ligands with formaldehyde and, optionally, another alkoxy or hydroxyaromatic compound or methylated hydroxyaromatic compound. The reaction proceeds by the hydroxymethylation of one aromatic ring of the poly(hydroxyarylene) ligand by formaldehyde in the presence of a strong acid or base followed by the condensation with another alkoxy or hydroxy substituted aromatic ring, thereby forming a methylene linkage between the poly(hydroxyarylene) ligand and the other substituted aromatic ring, which may also be a poly(hydroxyarylene) ligand or an alkoxy- or hydroxy-substituted aromatic compound such as phenol and phenol derivatives, such as resorcinol and naphthol; substituted methoxybenzenes, such as 1,3-dimethoxybenzene; and other similar compounds that are reactive with formaldehyde. It is believed that the presence of these alkoxy- or hydroxy-substituted aromatic compounds in the polymeric resin reduces the amounts of cations, such as $Na^+$ and $K^+$, that are separated from the source solution along with Cs when a copolymer is used.

The condensation reaction proceeds as follows:

$$Ar + HCHO \rightarrow ArCH_2OH$$

$$ArCH_2OH + Ar \rightarrow ArCH_2Ar$$

The polymerization reaction proceeds with multiple reaction sites at each poly(hydroxyarylene) ligand as indicated by the arrows. Also, alkoxy- or hydroxy-aromatic compounds such as phenol and resorcinol have multiple reaction sites and therefore the condensation reaction proceeds by step-reaction polymerization forming a network of cross-linked aromatic rings connected via methylene bridges as is typical in phenol-formaldehyde type resins. Therefore, the composition of the polymer will vary. The polymeric resins are glassy solids that can be crushed and are hydrophilic. They are reddish brown in color and shrink and swell only slightly.

While the composition varies, the active poly(hydroxyarylene)-ligand portion will consist of between about 5 to 100 mole percent of the polymer.

The poly(hydroxyarylene)-ligand-containing polymeric resins are characterized by selectivity for and removal of cesium ions present in source solutions. Such source solutions are usually highly basic pH nuclear waste storage solutions, neutral to basic pH industrial effluents, or contaminated groundwater streams. As noted above, such ions are present in streams produced by the semiconductor, nuclear waste cleanup, metals refining, electric power, and other industrial enterprises. The Cs ions to be removed are generally present at low concentrations and are in admixture with other alkali metal cations and complexing or chemical agents one does not desire to remove, but which are present in much greater concentrations in the solution. The separation is effected in a separation device, such as a column, through which the solution is flowed.

The process of selectively removing and concentrating Cs cations is characterized by the ability to quantitatively and selectively complex, from a larger volume of solution, Cs present at low concentrations. The Cs cations are recovered from a separation column by flowing through it a small volume of a first receiving liquid that contains reagents that quantitatively remove Cs ions from the column. The recovery of the separated Cs cations from the receiving phase or liquid can then be accomplished by known procedures.

DETAILED DESCRIPTION OF THE INVENTION

As summarized above, the present invention is drawn to the use of various poly(hydroxyarylene)-ligand-containing polymeric resins to remove, concentrate, and separate cesium cations from solutions containing other alkali metal cations and from nuclear waste streams in particular. Such solutions from which Cs ions are to be concentrated, separated, and/or recovered are referred to herein as "source solutions." In many instances, the concentration of Cs in the source solutions will be much less than the concentration of other alkali metal cations and other cations from which Cs is to be separated.

The removal and concentration of Cs is accomplished through the formation of a ligand complex of the selected Cs cations with a polymeric resin containing an active mole percent of a poly(hydroxyarylene) ligand, represented by Formulas I through IV, by flowing a source solution containing the Cs and other cations through a column packed with the resin to attract and bind the Cs cations to the poly(hydroxyarylene)-ligand portion of the resin. The Cs ions thus complexed to the ligand are selectively removed from the compound by breaking the ligand/cation complex by flowing a receiving solution through the column. The receiving solution is used in much smaller volume than the volume of the initial source solution so that the Cs ions recovered in the receiving liquid are in concentrated form relative to the source solution. The receiving liquids or recovery solutions are aqueous solutions in which the Cs cations are soluble and that have greater affinity for the Cs cations than does the poly(hydroxyarylene) ligand or that protonate the ligand. In either event, the Cs ions are quantitatively stripped from the ligand in concentrated form in the receiving solution. Once in the receiving liquid, the recovery of the Cs, if desired, can be accomplished using known procedures.

The poly(hydroxyarylene)-ligand-containing polymeric resins containing the ligands shown in Formulas I through IV may be prepared by various methods described above and illustrated in examples as set forth in the examples which follow.

EXAMPLE 1

A polymer was prepared from resorcinol, formaldehyde, and calix[6]arene. The calix[6]arene was prepared by known procedures, C. D. Gutsche et al., 68 Org. Synth. 238 (1990). In a three-necked round bottom flask equipped with a mechanical stirrer and a condenser were combined 6.6 g resorcinol, 6.6 g calix[6]arene, and 4.8 g NaOH. The reaction was maintained under nitrogen throughout the polymerization. The mixture was brought to reflux, and calcium carbonate (12 g) was added and the solution mixed for 5–45 minutes. Next, the formaldehyde (36 g) was added slowly as a 37% solution in water. This mixture was refluxed overnight. The water was then removed under reduced pressure, and the resulting material was dried overnight in a vacuum drying oven at 30°–75° C. The dried polymer was then put into a stirring beaker of water and acidified with HCl. The mixture was stirred for 6–24 hours, filtered, and dried. The resulting polymer product having calix[6]arene content of about 17 mole percent was then tested for ion binding properties.

EXAMPLE 2

The procedure of Example 1 was followed with the exception that phenol (7 g) was substituted in the place of resorcinol. The resulting polymer product having calix[6]arene content of about 14 mole percent was then tested for ion binding properties.

EXAMPLE 3

The procedure of Example 1 was followed with the exception that phloroglucide was substituted in the place of both resorcinol and calix[6]arene. The resulting polymer product having phloroglucide content of about 100 mole percent was then tested for ion binding properties.

EXAMPLE 4

The procedure of Example 1 was followed except that 1,3-dimethoxybenzene (7 g) was substituted for resorcinol and the reaction was refluxed for 124–180 hours before removing the water under reduced pressure. The resulting polymer product having calix[6]arene content of about 17 mole percent was then tested for ion binding properties.

EXAMPLE 5

The procedure of Example 1 was followed except that propyl-octol (6.6 g) was substituted in the place of calix[6]arene. The octol was prepared according to 54 J. Org. Chem 1305 (1989) where the R group is propyl. The resulting polymer product having propyl-octol content of about 20 mole percent was then tested for ion binding properties.

EXAMPLE 6

The procedure of Example 1 was followed except that propyl-octol was substituted in the place of both the resorcinol and the calix[6]arene. The resulting polymer product having propyl-octol content of about 100 mole percent was then tested for ion binding properties.

EXAMPLE 7

The procedure of Example 1 was followed except that calix[8]arene (6.6 g) was substituted in the place of the calix[6]arene. The resulting polymer product having calix[8]arene content of about 16 mole percent was then tested for ion binding properties.

The process of selectively and quantitatively concentrating and removing cesium present at low concentrations from a plurality of other alkali metal and perhaps other cations that may be present at much higher concentrations comprises (a) bringing the multiple-ion-containing source solution into contact with a poly(hydroxyarylene)-ligand-containing polymeric resin, wherein the ligand is as shown in Formulas I through IV, which causes the Cs species to complex with the poly(hydroxyarylene)-ligand portion of the resin, and (b) subsequently breaking or stripping the complexed Cs cation with a receiving solution in which (i) the Cs ions are soluble and (ii) the receiving solution has greater affinity for the Cs ions than does the poly (hydroxyarylene) ligand or protonates the ligand, thus forcing the Cs from the ligand. The receiving or recovery solution contains cesium ions in a concentrated form.

The polymeric resin containing the poly(hydroxyarylene) ligand (PR-L) functions to attract the cesium ion (Cs) as a cationic complex according to Formula V.

$$PR\text{-}L + Cs \rightarrow PR\text{-}L{:}Cs \qquad \text{(Formula V)}$$

wherein PR stands for polymeric resin and L stands for the poly(hydroxyarylene)-ligand portion of the resin. Cs stands for the cesium ion being removed.

Once the Cs cations are bound to the poly (hydroxyarylene)-ligand-containing polymeric resins, these complexed Cs cations are subsequently separated from the resin in a separate receiving liquid by use of a smaller volume of a receiving liquid according to Formula VI.

$$PR\text{-}L{:}Cs + RL \rightarrow PR\text{-}L + RL{:}Cs \qquad \text{(Formula VI)}$$

where RL stands for the receiving liquid.

The preferred embodiment disclosed herein involves carrying out the process by bringing a large volume of the source solution containing multiple ions as defined above, which solution may contain large concentrations of Na and K ions and may also contain other complexing and/or chelating agents, into contact with a poly(hydroxyarylene)

-ligand-containing polymeric resin in a separation column through which the source solution is first flowed to complex the Cs cations with the poly(hydroxyarylene)-ligand polymeric resins as indicated by Formula V above, followed by the sequential flow through the column of a smaller volume of a receiving liquid as indicated by Formula VI above.

Exemplary of receiving liquids that will strip Cs cations from the ligand are 0.5M $HNO_3$, 0.5–6M HCl, 0.5–1M $H_2SO_4$, 1M acetic acid, and the like and any others having similar properties which allow for the Cs cations to be stripped from the column. The degree or amount of concentration of the receiving liquid will obviously depend upon the concentration of the Cs cations in the source solution and the volume of source solution to be treated. The specific receiving liquids being utilized will also be a factor. Generally speaking, the concentration of Cs ions in the receiving liquid will be from 20 to 1,000,000 times greater than when in the source solution. Other equivalent apparatus may be used instead of a column, e.g. a slurry which is filtered and then washed with the receiving liquid to break the complexes and remove the Cs cations. The concentrated Cs cations are then recovered from the receiving liquid by known procedures familiar to those skilled in the art.

The examples which follow demonstrate how the poly (hydroxyarylene)-ligand-containing polymeric resins may be used to remove, concentrate, and separate Cs cations when they are present in certain source solutions. The resin-containing poly(hydroxyarylene) ligand is placed in a column. An aqueous source solution containing a mixture of certain Cs and other alkali metal cations, including any other metal ions that may be present in a much greater concentration, is passed through the column. The flow rate for the solution may be increased by applying pressure with a pump on the top or bottom of the column or applying a vacuum in the receiving vessel. After the source solution has passed through the column, a much smaller volume of a recovery solution (receiving liquid), i.e., aqueous solutions in which (a) the Cs cations are soluble and (b) the receiving solution has greater affinity for the Cs cations than does the poly(hydroxyarylene) ligand or protonates the ligand thus forcing the Cs ions from the ligand, are flowed through the column. The recovery solution (receiving liquid) strips Cs cations and collects them. These Cs cations are then present in concentrated form for subsequent recovery. The preceding listings of receiving solutions are exemplary and other receiving solutions may also be utilized. The only limitation on the receiving solution is its ability to function to remove the Cs cations from the poly(hydroxyarylene) ligand.

The following examples of separations and recoveries of Cs cations utilize the polymeric resins containing the poly (hydroxyarylene) ligands which were made as described in Examples 1 through 7. These examples are illustrative only and are not comprehensive of the many separations of Cs ions that are possible using the polymeric resins of this invention.

EXAMPLE 8

In this example, 0.1 g of the polymeric material from Example 1 was placed in a column. A 100 ml feed solution of 10 ppm Cs in 0.1M $Na_2CO_3$ was passed through the column using gravity flow. The column was then washed with 5 ml of deionized water to remove the Na ions. Finally, the Cs was eluted using 5 ml of 0.5M $HNO_3$ as a recovery solution. Flame AA spectrophotometric analysis showed that the Cs was removed from the feed solution to a level below the 1 ppm detection level and that greater than 95% of the Cs originally in the 100 ml feed solution was in the 5 ml recovery solution.

EXAMPLE 9

In this example, 0.1 g of the polymeric material from Example 2 was placed in a column. A 100 ml feed solution of 10 ppm Cs in 0.1M $KNO_3$ plus 4M $NaNO_3$ plus 1M NaOH was passed through the column using gravity flow. The column was then washed with 5 ml of deionized water to remove the K and Na ions. Finally, the Cs was eluted using 5 ml of 0.5M $HNO_3$ as a recovery solution. Flame AA spectrophotometric analysis showed that the Cs was removed from the feed solution to a level below the 1 ppm detection level and that greater than 95% of the Cs originally in the 100 ml feed solution was in the 5 ml recovery solution.

EXAMPLE 10

In this example, 0.1 g of the polymeric material from Example 3 was placed in a column. Otherwise, the procedure was the same as in Example 9 and the results were also the same.

EXAMPLE 11

In this example, 0.1 g of the material from Example 4 was placed in a column. A 100 ml feed solution of 10 ppm Cs in $5\times10^{-5}$M $RbNO_3$, 0.43M $Al(NO_3)_3$, 0.15M $Na_2SO_4$, 3.4M NaOH, 0.23M $Na_2CO_3$, 0.43M $NaNO_2$, 1.67M $NaNO_3$, 0.089M NaF and 0.025M $Na_3PO_4$ was passed through the column using gravity flow. This solution is similar to the composition of many of the supernatant solutions in the nuclear waste tanks at the DOE Hanford, Wash., site. The column was then washed with 5 ml of 2M NaOH followed by 5 ml of deionized water to remove the other elements present. Finally, the Cs was eluted using 5 ml of 0.5M $HNO_3$ as a recovery solution. Flame AA spectrophotometric analysis showed that the Cs was removed from the feed solution to a level below the 1 ppm detection level and that greater than 95% of the Cs originally in the 100 ml feed solution was in the 5 ml recovery solution, and the Na and Al levels were below the level of detection in the recovery solution.

EXAMPLE 12

The process of Example 11 was repeated except that 0.12M $KNO_3$ was also added to the feed solution. The results were also similar to those of Example 11. The ability to perform the Cs separation just as effectively with potassium present is important since this is where most state of the art systems fail. One such system is the CS-100 ion exchange resin which contains a phenol/formaldehyde polymer, as well as a related resorcinol/formaldehyde polymer.

EXAMPLE 13

In this example, 0.1 g of the polymeric material from Example 5 was placed in a column. Otherwise, the procedure was the same as in Example 9 and the results were also the same.

Although the invention has been described and illustrated by reference to certain specific polymeric resins containing poly(hydroxyarylene) ligands as shown in Formulas I through IV and the process of using them, other analogs of these poly(hydroxyarylene) ligands are also within the scope of the invention as defined in the following claims.

We claim:

1. A poly(hydroxyarylene)-ligand-containing polymeric resin which is a reaction product of said poly (hydroxyarylene) ligand, formaldehyde, and, optionally, another alkoxy- or hydroxy-aromatic compound or methylated hydroxyaromatic compound to form a resin having from about 5 to 100 mole percent of poly(hydroxyarylene) ligand.

2. A polymeric resin according to claim 1 wherein the poly(hydroxyarylene) ligand is a member selected from the group consisting of:

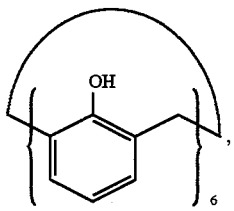

,

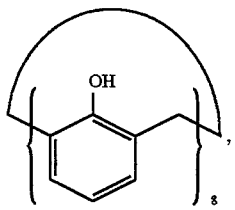

,

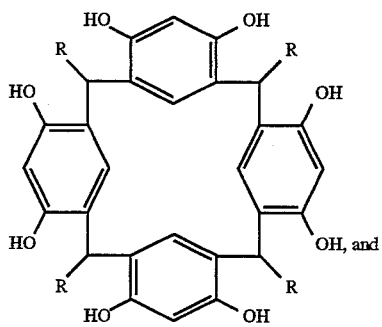

OH, and

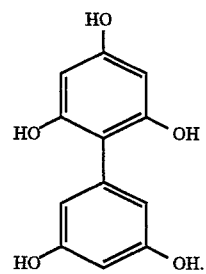

.

3. A polymeric resin according to claim 2 wherein said poly(hydroxyarylene) ligand is:

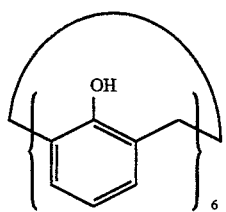

.

4. A polymeric resin according to claim 2 wherein said poly(hydroxyarylene) ligand is:

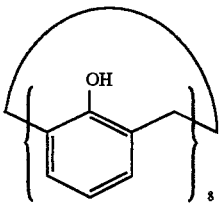

.

5. A polymeric resin according to claim 2 wherein said poly(hydroxyarylene) ligand is:

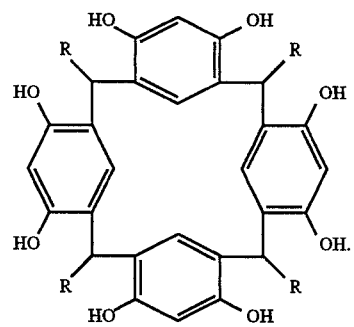

.

6. A polymeric resin according to claim 5 wherein R is propyl.

7. A polymeric resin according to claim 2 wherein said poly(hydroxyarylene) ligand is:

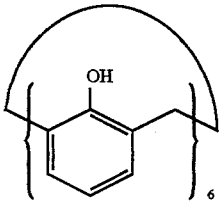

.

* * * * *

UNITED STATES PATENT AND TRADEMARK OFFICE
CERTIFICATE OF CORRECTION

PATENT NO. : 5,656,702
DATED : Aug. 12, 1997
INVENTOR(S) : Bryon J. Tarbet, Garren Maas, Krzysztof E. Krakowiak, Ronald L. Bruening It is certified that error appears in the above-identified patent and that said Letters Patent is hereby corrected as shown below:

<u>In the Claims</u>:

Column 10, Claim 7, line 45, delete " 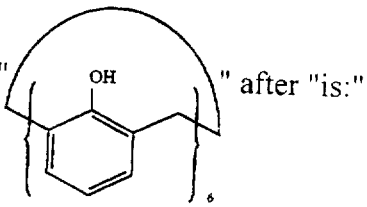 " after "is:"

Column 10, Claim 7, line 45, insert " 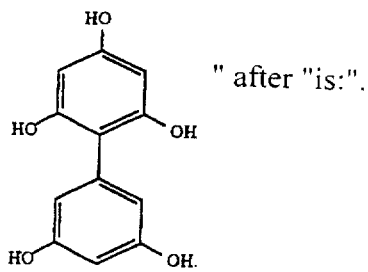 " after "is:".

Signed and Sealed this

Twentieth Day of July, 1999

Attest:

Q. TODD DICKINSON

*Attesting Officer*     *Acting Commissioner of Patents and Trademarks*